United States Patent [19]

Shelhart

[11] Patent Number: 5,251,796

[45] Date of Patent: Oct. 12, 1993

[54] INTEGRATED LOCK AND STORAGE RACK FOR A BICYCLE

[76] Inventor: Michael Shelhart, 3503 W. 228th St., Torrance, Calif. 90505

[21] Appl. No.: 832,597

[22] Filed: Feb. 7, 1992

[51] Int. Cl.⁵ .................................................. B62J 7/00
[52] U.S. Cl. .................................... 224/39; 224/30 R; 224/31; 224/32 A
[58] Field of Search ............... 224/39, 30 R, 31, 32 R, 224/32 A, 33 R, 33 A, 40, 34, 35, 36, 37; 70/233, 234, 235, 236, 51, 54, 55, 56

[56] References Cited

U.S. PATENT DOCUMENTS

| 1,629,859 | 5/1927 | Burke | 224/39 |
| 3,475,931 | 11/1969 | Foote | 70/54 |
| 3,967,475 | 7/1976 | Zane . | |
| 4,174,795 | 11/1979 | Jackson et al. . | |
| 4,256,322 | 3/1981 | Otsuka et al. . | |
| 4,271,690 | 6/1981 | Jaulmes . | |
| 4,436,232 | 3/1984 | Zane et al. . | |
| 4,596,346 | 6/1986 | Lepage | 224/39 |
| 4,598,847 | 7/1986 | Ames, III . | |
| 4,760,943 | 8/1988 | Bass et al. | 224/39 |
| 5,138,901 | 8/1992 | Dabandjian et al. | 224/31 |

Primary Examiner—Henry J. Recla
Assistant Examiner—David J. Walczak
Attorney, Agent, or Firm—Edward E. Roberts

[57] ABSTRACT

A combination U-shaped lock and rack apparatus for attachment to a bicycle, the apparatus including a combination U-shaped bicycle lock and a storage rack whereby the two are integrated into one functional device. The rack is designed to accept the U-shaped metal lock, carry various items desired by the rider and to be rigidly attached to the bicycle. The lock mates with the rack to form an outside frame thereof whereby the combination provides a place to carry the lock while strengthening the rack to support more cargo. The lock can be removed even when the rack is loaded with gear and accessories thus providing mutual exclusion of use of the lock and rack.

19 Claims, 2 Drawing Sheets

INTEGRATED LOCK AND STORAGE RACK FOR A BICYCLE

BACKGROUND OF THE INVENTION

The background of the invention will be discussed in two parts.

FIELD OF THE INVENTION

This invention relates to bicycle storage racks and bicycle locks, and more particularly to a storage rack integrated with a U-shaped lock whereby the combination makes use of the lock while storing it, at the same time utilizing the lock to form a more rigid bicycle rack.

DESCRIPTION OF THE PRIOR ART

Bicycling is a very popular sport, and as, is known to the participants, the bicycle is becoming more technologically developed wherein the use thereof for traveling longer distances is growing. Further, the use of the bicycle for a utility form of transportation (work and play) is rapidly becoming more commonplace with the concurrent desirability of means for carrying miscellaneous luggage and various accessory items becoming an increasing need. Typical items ordinarily carried might include a lunch, coat, briefcase, or recreational equipment.

In addition to luggage carrier means, the cyclist will ordinarily have means for locking the bicycle to prevent or discourage theft. The demand for both the lock and the rack is growing, research showing that 26% of the people that purchase a bike will currently also purchase a rack and lock.

The U-shaped configured lock has become one of the most often purchased locking means, the lock being of the type in which the U-shaped member is passed through the spokes or sprocket of the wheel, while engaging a portion of the frame, with the locking member or bar then being attached to the free ends of the U-shaped member. However, due to the required length and bulk of such a locking apparatus, carrying this device has been a real problem for the cyclist. Various manufacturers have introduced different ways to carry the U-shaped lock on the bike so as not to hinder the rider, however, there still has not been any satisfactory way to affix this lock to a bike without giving up space that could better be used to store other more essential items such as water bottles and tire pumps.

One lock and rack combination for bicycles is disclosed in U.S. Pat. No. 4,256,322, entitled "Combined Carrying and Locking Device for a Bicycle", such patent issuing on Mar. 17, 1981 to Otsuka, et al, the device being configured and adapted for providing a lock-carrying mechanism for attachment to the frame forward of the rider, with the lock and mechanism then doubling as a carrier. In this apparatus, however, any carried items would have to be removed when usage of the lock is desired.

Another apparatus is shown and described in European Patent 337,552, entitled "Luggage-carrier with Integrated Shackle Lock", such patent issuing on Oct. 18, 1989 to Doppenberg. This patent shows two embodiments, one in which the lock is carried atop the rack and another in which the lock is carried on the side of the rack. Likewise with the embodiments of this patent, the carried items would have to be removed to gain access to, or use, the lock.

Other means for storing locks under the rack or platform are disclosed in U.S. Pat. No. 4,271,690, entitled "Antitheft Device for Two-wheeled Vehicles", such patent issuing on Jun. 9, 1981 to Jaulmes, the device being configured and adapted for storing the lock under the rack; and in British Patent 2,180,513, entitled "Bicycle Luggage Rack", such patent issuing on Apr. 1, 1987 to Schmidt, the device providing for storage of a U-shaped lock under the platform.

Additional vehicular attachments for supporting or storing locking mechanisms are shown and described in the following; U.S. Pat. No. 4,436,232 issued to Zane et al. on Mar. 13, 1984 discloses a bracket for storing a U-shaped lock for a motor cycle; U.S. Pat. No. 3,967,475 issued to Zane on Jul. 6, 1976, U.S. Pat. No. 4,174,795 issued to Jackson et al. on Nov. 20, 1979; and U.S. Pat. No. 4,598,847 issued to Ames, III on Jul. 8, 1986.

Thus, there is an existing need for the utilitarian concept of integrating the U-shaped lock and the luggage rack to provide a convenient storage location for the lock, while permitting ready removal for use. The combination lock and luggage rack of the instant invention solves such need, and also coincides with the current growth of the industry, in that it integrates the U-shaped lock into the luggage rack design thereby providing for storage of the lock, while at the same time improving the strength and rigidity of the luggage rack. Such combination has not been found in prior art apparatus.

SUMMARY OF THE INVENTION

In accordance with the present invention, there is provided a combination U-shaped bicycle lock and a luggage rack whereby the two are integrated into one functional device. The rack is provided with bicycle attaching support members secured to a load platform having opposing generally parallel arcuately configured reinforcing side rails or channels, the inner contour of which is configured for mating coacting engagement with the side arms of the generally U-shaped member of the lock mechanism. The forward end of the platform is provided with an upwardly angled or bent luggage shift stop portion with the rear end of the platform being dimensioned and configured to the contour of the bight portion of the U-shaped locking member which fits in generally edge abutting relation therewith.

The transverse lock bar is attached to the free ends of the U-shaped locking member beneath the platform stop portion. The parts are dimensioned, configured and arranged with generally tight tolerances for enabling a close sliding relationship between the arms of the U-shaped locking member and the channels, with the tolerance of the length of the channels and platform configuration being such that the lock mechanism provides additional structural reinforcement while preventing rattling. The channels are preferably semi-circular in cross-section with the longitudinal center axes of the channels lying in a common plane below and parallel to the plane of the platform for enabling removal of the U-shaped locking member without removal of any articles retained atop the platform.

Thus the rack is constructed to accept the U-shaped metal lock, carry various items desired by the rider and to be rigidly attached to the bicycle The lock mates with the rack to form an outside frame thereof whereby the combination provides a place to carry the lock while strengthening the rack to support more cargo.

It is thus an aspect of the invention to provide a bicycle luggage rack that is stronger and more rigid than existing racks while at the same time incorporating therein provision for carrying, in a non-interfering manner, one of the U-shaped type locks, the lock being removable while the rack is in place thus allowing the cyclist to use the lock without removing the rack itself, or the luggage thereon, the rack without the lock still being as strong as currently available racks.

It is another aspect of the invention to provide an integrated lock and luggage rack apparatus whereby the lock and rack have mutually exclusive use, the lock not hindering the use of the luggage rack, even if fully loaded with gear and accessories, whether the lock is attached or removed.

The foregoing and other objects, features and advantages of the invention will become readily apparent from a reading of the specification when taken in conjunction with the drawings, wherein there is shown and described a storage rack integrated with a U-shaped lock whereby the combination stores the lock while making use of the lock to strengthen the rack, and in which like reference numerals refer to like elements in the several views.

DESCRIPTION OF THE PREFERRED EMBODIMENT

Figure 1:
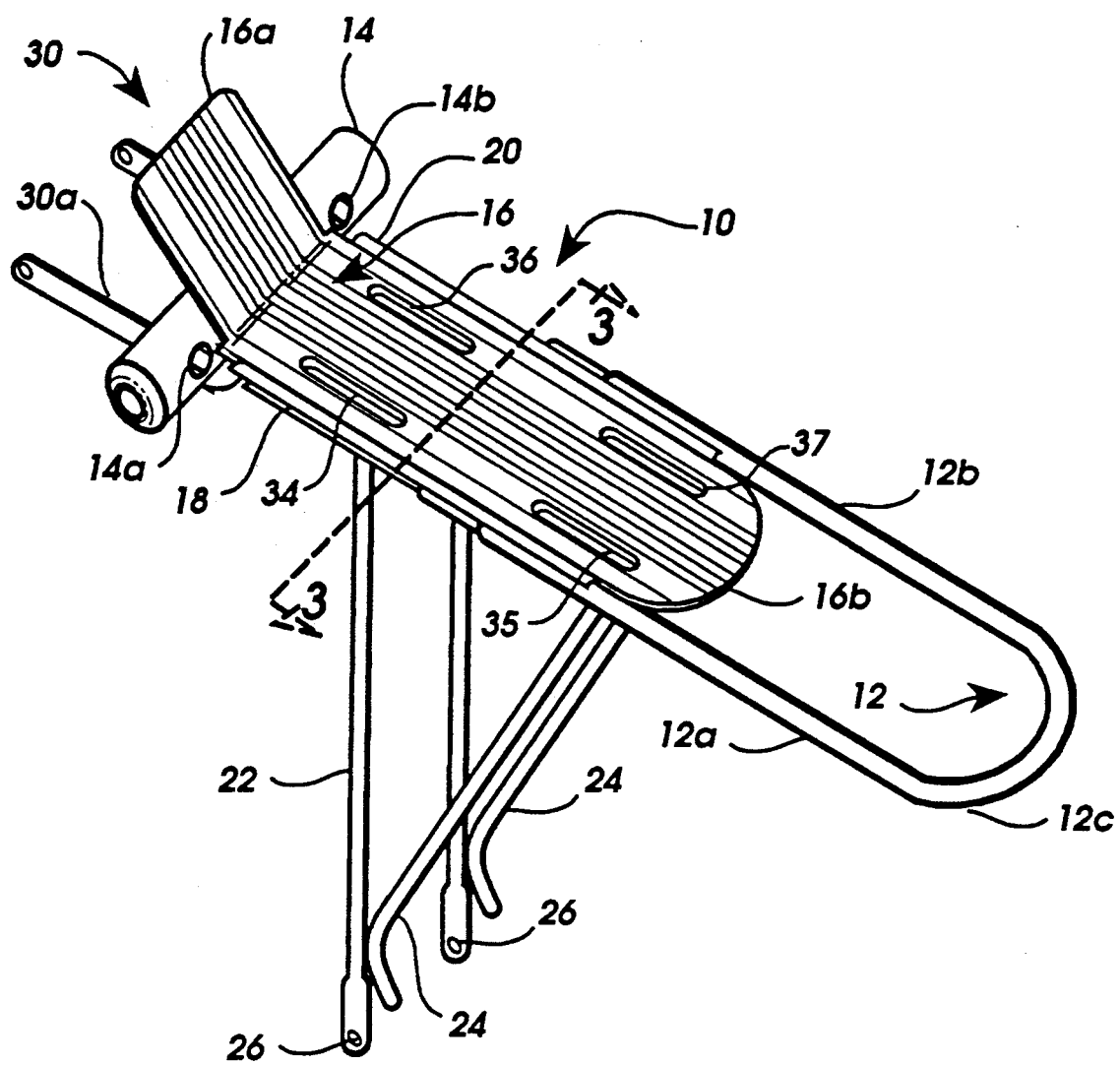
FIG. 1 is an exploded perspective view of a integrated lock and luggage rack apparatus in accordance with the invention.

Referring now to the drawings in general, there is shown luggage rack apparatus, generally designated 10, having portions thereof configured, dimensioned and arranged for matingly coactingly receiving thereon a shackle lock mechanism including a generally U-shaped locking member, generally designated 12, which coacts with a transverse locking bar 14 as will hereinafter be described.

The rack apparatus 10 includes a load platform 16, which is preferably an extruded member having integrally formed laterally longitudinally extending side rails or channels 18, 20, with the forward end of the platform being angled or bent forwardly and upwardly to serve as a luggage slide stop portion 16a. For reasons which will become apparent, the rear edge 16b of the platform 16 is contoured on a radius matching that of the radius of the bight portion 12c of the U-shaped locking member.

For attachment to the bike (not shown), first and second generally U-shaped support struts 22 and 24 are provided for attachment in any suitable manner to the undersurface of the platform 16. The struts are formed of any convenient material, such as aluminum rod material, and bent into suitable, preferably generally U-shaped configurations for attachment of the bight portions thereof to the undersurface of the platform 16, with the free ends thereof joined together.

As best illustrated in FIG. 1, the terminal ends of the arms of the front strut 22 are provided with apertures 26 for attachment to the frame of the bicycle at a location adjacent the rear axle thereof. By reference to FIG. 4, the strut 22 has the arms thereof forming an angle of approximately eighty-five or ninety degrees to the plane of the platform 16, with the rear strut 24 forming an angle of approximately sixty degrees.

The front support strut 22 is welded, bolted, or otherwise attached to the underside of load platform 16. The front main support strut 22, may alternatively be formed of tubular material or other desired shape, such as square, cross-section. Similarly the rear support strut 24 is formed of the same material and with the same cross-section as the front strut 22. Support strut 24 can, similar to strut 22, be attached to the platform 16 and then the legs thereof are welded or otherwise attached to the respective legs of support strut 22.

A luggage rack frame mounting bracket 30 is provided and includes first and second generally identically dimensioned forwardly extending somewhat L-shaped bar members 30a and 30b, used to affix by bolts, or other desirable means, the luggage rack 10 to the bicycle frame. Bar members 30a and 30b are attached, by bolts or other desirable means, to the underside of the forward end of the platform 16 and extend forward for attachment to the bicycle frame below the seat. The bar members 30a, 30b are provided with holes at the forward ends thereof for being bolted through the holes in the standard brazed-on mounts located beneath the seat on most bikes. If necessary, the bar members 30a, 30b are bent by the appropriate amount, for such attachment.

Figures 2, 4:
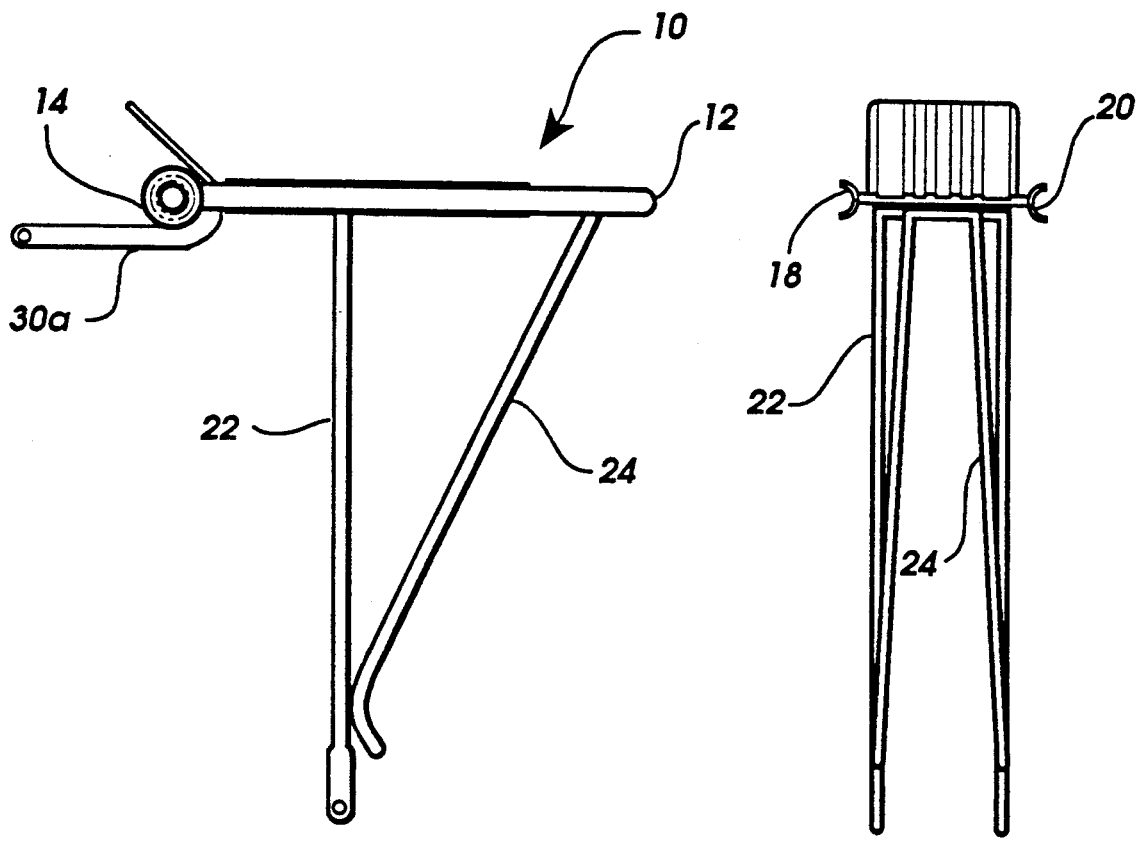
FIG. 2 is a rear elevational view of the luggage rack of the apparatus of FIG. 1 as viewed from the right in the view of FIG. 1.
FIG. 4 is a side elevational view of the apparatus of FIG. 1 assembled and as viewed from the left side of the view of FIG. 1.

Bracket 30 may include sliding means for allowing adjustability of the lock/rack combination to fit different sizes of bike frames. As best shown in FIG. 4, the bar members 30a, 30b are generally L-shaped to depend from the plane of the platform 16 and this, along with the selected angle of stop portion 16a enables the transverse locking bar 14 to be nestingly received in this angular space when assembled to the rack 10.

The locking mechanism to be used with the rack 10 is commonly referred to as a shackle lock and includes the transverse locking bar 14 and the U-shaped locking member 12. The locking bar 14 includes first and second apertures 14a, 14b, spaced apart a distance equal to the spacing between the free ends of the arms 12a, 12b of the U-shaped locking member 12. The free ends of the arms 12a, 12b of the locking member 12 are of reduced diameter and shaped for being received within lock apertures 14a, 14b. The U-shaped locking member is generally formed from a heat treated steel rod, and the transverse lock bar is formed as a tubular member with one end capped and the other end having a key-actuated lock opening for actuation of the mechanism inside the bar 14. The specific lock mechanism within the bar 14 forms no part of the present invention and a detailed description thereof is unnecessary.

Figure 3:
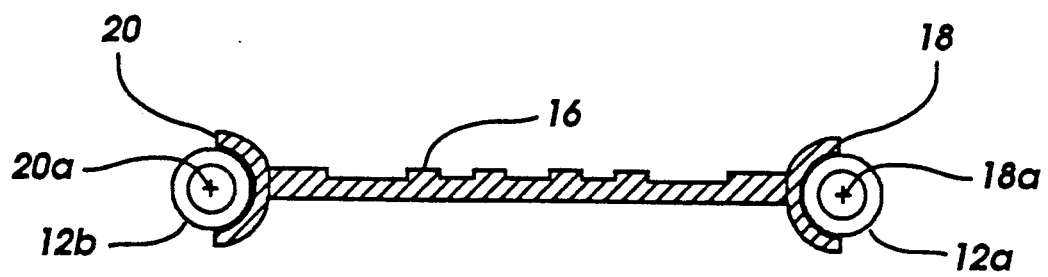
FIG. 3 is a sectional view of the extruded platform taken along lines 3—3 of the apparatus of FIG. 1.
Figure 5:
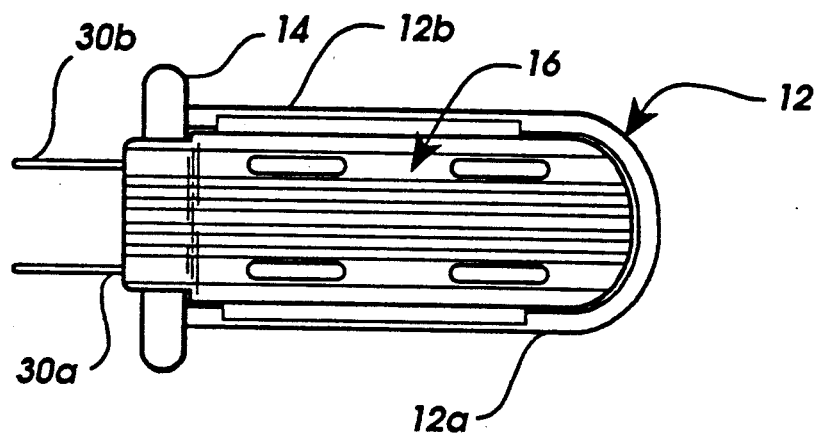
FIG. 5 is a to view of the apparatus of FIG. 4 showing the lock engaged with the load platform.

Referring now to the figures, and particularly to FIGS. 1, 3 and 5, the details pertaining to the construction of the platform 16, and its coaction with the lock apparatus will now be described. The platform 16 is preferably formed as a unitary member, such as by aluminum extrusion, to form the side channels 18 and 20 integrally therewith. After extrusion, the channels 18 and 20 are shortened to the desired length, the rear end 16b is shaped, longitudinal slots 34-37 are cut and forward stop portion 16a is bent.

Included in the platform 16 are the semi-circular guide rails or channels 18, 20, on each side of the platform 16. The channels 18, 20 have the centers 18a, 20a, of the longitudinal axes thereof lying in a common plane, below the plane of the platform 16. The arms 12a, 12b of the U-shaped locking member 12, best shown in FIG. 3, have the diameter of each arm closely approximating the inner diameter of the channels 18, 20 for mating, sliding, coacting relationship therewith. Correspondingly, the radius of the rear end 16b of platform 16 closely approximates the radius of the bight portion 12c of the U-shaped locking member 12.

For attachment of the lock to the rack 10, the arms 12a, 12b of the U-shaped locking member 12 are slid into coacting engagement with the channels 18, 20 which act as guides. The extent of sliding is reached when the bight portion 12c is in abutting relationship with the matingly configured rear end 16b of platform 16. The transverse lock bar 14 is positioned for insertion of the ends of the arms 12a, 12b into the lock apertures 14a, 14b thereof. The assembly of the lock to the rack 10 is depicted in FIGS. 4 and 5. For removal, the key (not shown) of the lock is actuated to permit separation of the transverse lock bar 14, after which the locking member 12 may be removed.

Once closed the lock serves to spring the lock and rack together so as to establish an integral apparatus. The lock providing additional outside support, the combination then becomes so strong that it allows the user to carry larger payloads than would normally be carried. The semicircular configuration of the channels 18, 20, coupled with the plane of the longitudinal centers 18a, 20a thereof lying below the plane of the platform 16, enables removal of the lock even when the rack is loaded with gear and accessories, thus providing mutual exclusion of use of the lock and rack.

The upwardly bent front stop portion end 16a of the platform 16 prevents cargo from sliding forward into the rider. This portion 16a also serves to support the U-shaped lock while acting as a stop for the lock when it is affixed in place in channels 18, 20. The dimensions and configuration of the mounting bracket 20 and platform 16, including the radiused end 16b and the angled stop portion 16a, are tight in tolerance for enabling snug, mating, coacting engagement of both portions of the lock apparatus therewith to provide an integrated structural assembly with little room for rattling.

It will be apparent that while a preferred embodiment of the invention has been shown and described, various modifications and changes may be made without departing from the true spirit and scope of the invention. For example, it is to be expressly understood that the apparatus may be associated with other utilization vehicles other than bicycles so as to provide for integration of a lock and luggage rack for such utilization vehicles.

Having set forth the preferred embodiment of the invention, what is claimed is:

1. A combination locking device/luggage rack for coupling to a bicycle, said apparatus comprising:
   lock means including:
   a U-shaped locking member having first and second arm portions and a bight portion;
   a lock bar having aperture means therein for lockingly receiving free ends of said arm portions;
   rack means including a load carrying platform portion having first and second ends and first and second generally parallel channels one each extending longitudinally along the length of a respective one of said opposite long sides thereof, the spacing between longitudinal centers of said channels corresponding to the spacing between centers of said arm portions for enabling mating coacting sliding of said arm portions therein whereby said bight portion substantially abuts said first end of said platform portion to thereby form an outside frame about said platform portion, said second end being configured for enabling positioning of said lock bar into locking engagement with said U-shaped locking member, said lock means and said rack means being dimensioned, configured and coactively mated for enabling said lock means to provide structural support to said rack means; and
   means coupled to said platform portion for enabling attachment of said rack means to the frame of a bicycle.

2. The apparatus according to claim 1 wherein said channels are arcuately configured and said arm portions are matingly configured in cross-section.

3. The apparatus according to claim 2 wherein said channels are semi-circular in cross-section, said arm portions are circular in cross-section, and wherein the longitudinal centers of said channels lie in a common plane parallel to and below the plane of said platform.

4. The apparatus according to claim 3 wherein said platform portion is formed as an extrusion with said channels integrally formed therewith.

5. The apparatus according to claim 4 wherein one end of said platform portion includes an upwardly angled stop portion and bracket means attached thereto, said stop portion and said bracket means being dimensioned and configured for enabling said lock bar to be nestingly received therebetween.

6. A combination locking device/luggage rack for coupling to a bicycle, said apparatus comprising:
   lock means including:
   a U-shaped locking member having first and second arm portions matingly configured in circular cross-section and a bight portion;
   a lock bar having aperture means therein for lockingly receiving free ends of said arm portions;
   rack means including a load carrying platform portion having first and second ends and first and second generally parallel longitudinally extending semi-circular channels on opposite long sides thereof, the spacing between longitudinal centers of said channels corresponding to the spacing between centers of said arm portions for enabling mating coacting sliding of said arm portions therein, at least one of said first and second ends being configured for enabling positioning of said lock bar into locking engagement with said U-shaped locking member, said lock means and said rack means being dimensioned, configured and arranged for enabling said lock means to provide structural support to said rack means;
   said at least one end includes a bent luggage stop portion and the other end is contoured to match the contour of said bight portion; and
   means coupled to said platform portion for enabling attachment of said rack means to the frame of a bicycle.

7. The apparatus according to claim 6 wherein said bight portion is arcuate and said other end is matingly configured with said channels being positioned such that said bight portion abuts said other end with said lock means attached to said rack means.

8. A combination locking device/luggage rack for coupling to a bicycle, said apparatus comprising:
   lock means including:
      a U-shaped locking member having first and second arm portions and a bight portion;
      a lock bar having aperture means therein for lockingly receiving free ends of said arm portions;
   rack means including a load carrying platform portion having first and second and first and second generally parallel longitudinally extending channels on opposite long sides thereof, the spacing between longitudinal centers of said channels corresponding to the spacing between centers of said arm portions for enabling mating coating sliding of said arm portions therein, at least one of said first and second ends being configured for enabling positioning of said lock bar into locking engagement with said U-shaped locking member, said lock means and said rack means being dimensioned, configured and arranged for enabling said lock means to provide structural support to said rack means;
   said platform portion is formed as an extrusion with said channels integrally formed therewith;
   said channels are semi-circular in cross-section and said arm portions are circular in cross-section and of the same radius;
   one end of said platform portion includes an upwardly angled stop portion and bracket means attached thereto, said stop portion and said bracket means being dimensioned and configured for enabling said lock bar to be nestingly received therebetween;
   wherein the other end of said platform portion is contoured to the contour of said bight portion; and
   means coupled to said platform portion for enabling attachment of said rack means to the frame of a bicycle.

9. The apparatus according to claim 8 wherein the longitudinal centers of said channels lie in a common plane parallel to and below the plane of said platform portion.

10. The apparatus according to claim 9 wherein the longitudinal centers of said channels lie in a common plane parallel to and below the plane of said platform.

11. A combination locking device/luggage rack for coupling to a bicycle, said apparatus comprising:
   lock means including a U-shaped locking member having first and second arm portions and a bight portion and a lock bar having aperture means therein for lockingly receiving at least one free end of said U-shaped locking member;
   rack means having a platform portion with first and second longitudinally extending channels on opposite long sides thereof, the spacing between longitudinal centers of said channels corresponding to the spacing between centers of said arm portions for enabling sliding of said arm portions therein, said platform portion and said lock means being configured, dimensioned and arranged for enabling positioning of said lock bar into locking engagement with said U-shaped locking member such that said bight portion is in substantial abutment with said platform portion to form a frame integral with and encompassing said platform portion to thereby provide structural support to said rack means; and
   means coupled to said platform portion for enabling attachment of said rack means to the frame of a bicycle.

12. The apparatus according to claim 11 wherein said channels are arcuately configured and said arm portions are matingly configured in cross-section.

13. The apparatus according to claim 12 wherein said channels are semi-circular in cross-section and said arm portions are circular in cross-section.

14. The apparatus according to claim 12 wherein said platform portion is formed as an extrusion with said channels integrally formed therewith.

15. The apparatus according to claim 14 wherein the longitudinal centers of said channels lie in a common plane parallel to and below the plane of said platform.

16. The apparatus according to claim 11 further including means coupled to said platform portion for enabling attachment of said rack means to the frame of a bike.

17. A combination locking device/luggage rack for coupling to a bicycle, said apparatus comprising:
   lock means including a U-shaped locking member having a pair of free ends and a lock bar having aperture means therein for lockingly receiving at least one of the free ends of said U-shaped locking member;
   rack means having a platform portion with first and second longitudinally extending channels on opposite long sides thereof, the spacing between longitudinal centers of said channels corresponding to the spacing between centers of said arm portions for enabling sliding of said arm portions therein, said platform portion and said lock means being configured, dimensioned and arranged for enabling positioning of said lock bar into locking engagement with said U-shaped locking member, while enabling said lock means to provide structural support to said rack means;
   one end of said platform portion includes a bent luggage stop portion and the other end is contoured to match the contour of the bight portion of said U-shaped locking member; and
   means coupled to said platform portion for enabling attachment of said rack means to the frame of a bicycle.

18. The apparatus according to claim 17 wherein said bight portion is arcuate and said other end is matingly configured with said channels being positioned such that said bight portion abuts said other end with said lock means attached to said rack means.

19. The apparatus according to claim 18 wherein said rack attachment means includes bracket means adjacent said stop portion of said platform, the configuration of said bracket means and the angle of said stop portion forming a space therebetween for nestingly receiving said lock bar.

* * * * *